(12) United States Patent
Armangau et al.

(10) Patent No.: US 11,068,299 B1
(45) Date of Patent: Jul. 20, 2021

(54) MANAGING FILE SYSTEM METADATA USING PERSISTENT CACHE

(71) Applicant: EMC IP Holding Company LLC, Hopkinton, MA (US)

(72) Inventors: Philippe Armangau, Acton, MA (US); Christopher A. Seibel, Walpole, MA (US); John Gillono, North Chelmsford, MA (US); Bruce E. Caram, Hudson, MA (US); Yubing Wang, Southborough, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 15/669,364

(22) Filed: Aug. 4, 2017

(51) Int. Cl.
*G06F 3/06* (2006.01)
*G06F 9/46* (2006.01)
*G06F 9/30* (2018.01)

(52) U.S. Cl.
CPC ............ *G06F 9/466* (2013.01); *G06F 3/0619* (2013.01); *G06F 3/0659* (2013.01); *G06F 3/0688* (2013.01); *G06F 9/3004* (2013.01); *G06F 9/30087* (2013.01)

(58) Field of Classification Search
None
See application file for complete search history.

(56) References Cited

U.S. PATENT DOCUMENTS

| | | | |
|---|---|---|---|
| 6,601,137 B1 * | 7/2003 | Castro | G06F 12/0873 707/999.2 |
| 7,533,215 B2 * | 5/2009 | Faber | G06F 9/4418 707/999.001 |
| 8,347,041 B2 | 1/2013 | Banerjee | |
| 8,661,068 B1 | 2/2014 | Seibel et al. | |
| 8,719,520 B1 | 5/2014 | Piszczek et al. | |
| 9,020,987 B1 | 4/2015 | Nanda et al. | |
| 9,032,151 B2 | 5/2015 | Iyigun et al. | |
| 9,069,682 B1 | 6/2015 | Veeraswamy | |
| 9,122,589 B1 | 9/2015 | Bono et al. | |
| 9,135,123 B1 | 9/2015 | Armangau et al. | |
| 9,146,928 B1 | 9/2015 | Noveck | |
| 9,213,717 B1 | 12/2015 | Pawar et al. | |
| 9,268,502 B2 | 2/2016 | Zheng et al. | |
| 9,280,578 B1 | 3/2016 | Zhou et al. | |
| 9,286,007 B1 | 3/2016 | Bono | |
| 9,311,333 B1 | 4/2016 | Pawar et al. | |
| 9,361,306 B1 | 6/2016 | Pawar et al. | |

(Continued)

*Primary Examiner* — Sean D Rossiter
*Assistant Examiner* — Stephanie Wu
(74) *Attorney, Agent, or Firm* — BainwoodHuang

(57) ABSTRACT

A technique for managing metadata in a data storage system includes receiving a set of data to be stored in a file system of the data storage system and calculating values of metadata blocks that the file system will use to organize the set of data in the file system. The technique aggregates values of the metadata blocks and sends them in a single, atomic transaction to a persistent cache. The transaction either succeeds, in which case the persistent cache stores the values of all of the metadata blocks, or it fails, in which case the persistent cache stores none of the values of the metadata blocks. Over time, the persistent cache flushes the values of the metadata blocks to a set of non-volatile storage devices that back the metadata blocks in the data storage system.

19 Claims, 4 Drawing Sheets

(56) References Cited

U.S. PATENT DOCUMENTS

| | | |
|---|---|---|
| 9,442,955 B1 | 9/2016 | Pawar et al. |
| 9,460,177 B1 | 10/2016 | Pawar et al. |
| 9,535,801 B1 | 1/2017 | Natanzon et al. |
| 9,645,932 B1 | 5/2017 | Bono et al. |
| 2003/0212865 A1* | 11/2003 | Hicken ............... G06F 12/0804 711/135 |
| 2004/0003172 A1* | 1/2004 | Su ........................ G06F 3/061 711/112 |
| 2007/0050548 A1* | 3/2007 | Bali ................... G06F 12/0804 711/118 |
| 2007/0143550 A1* | 6/2007 | Rajwar ............... G06F 12/0811 711/146 |
| 2012/0151118 A1* | 6/2012 | Flynn ................. G06F 11/1008 711/6 |
| 2012/0215982 A1* | 8/2012 | Bell, Jr. ............. G06F 12/0888 711/119 |
| 2013/0054869 A1 | 2/2013 | Tolia et al. |
| 2013/0185475 A1* | 7/2013 | Talagala ............. G06F 12/0866 711/102 |
| 2014/0189250 A1* | 7/2014 | Kosinski ............ G06F 12/0895 711/138 |
| 2014/0330784 A1* | 11/2014 | Sundaram ............... H04L 29/06 707/639 |
| 2015/0261674 A1* | 9/2015 | Wei ..................... G06F 12/0866 711/135 |
| 2015/0279463 A1 | 10/2015 | Berke |
| 2016/0011984 A1* | 1/2016 | Speer ..................... G06F 3/067 711/102 |
| 2016/0062856 A1 | 3/2016 | Mu et al. |
| 2016/0188500 A1* | 6/2016 | Morris ............... G06F 13/1673 711/154 |
| 2018/0189172 A1* | 7/2018 | Kim .................. G06F 12/0246 |
| 2018/0246664 A1* | 8/2018 | Wu ........................ G11C 16/06 |
| 2018/0285275 A1* | 10/2018 | Barczak ............. G06F 12/0871 |
| 2018/0300086 A1* | 10/2018 | Han ....................... G06F 3/061 |
| 2019/0018601 A1* | 1/2019 | Dubeyko ............. G06F 3/0643 |

\* cited by examiner

MANAGING FILE SYSTEM METADATA USING PERSISTENT CACHE

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems include file systems that employ transaction logs for temporarily storing metadata changes. A file system may implement a transaction log as a circular buffer of limited size on one or more flash drives. The transaction log may be provided as an intent log, which stores intended changes to file system metadata blocks consequent to modifications of data. As the file system writes metadata blocks as part of its normal processing, the file system invalidates corresponding entries in the transaction log. In the event of a system failure, a storage processor may check the transaction log upon restarting and replay any transactions that have not yet been invalidated. In this manner, the file system may restore a consistent state in which its metadata structures properly reflect and organize the data stored in the file system.

SUMMARY

The increased use of SSDs (solid state disks), flash memory, and soon NVMe (non-volatile memory express), has helped data storage systems to become much faster at moving data. With the adoption of fast storage devices, features that previously had an insignificant impact on performance are now becoming limiting factors. Along these lines, transaction logs can be particularly burdensome for a data storage system to operate, in terms of memory copies, thread management, resource locking, and resource contention, for example. What is needed is a way of fulfilling the role of a transaction log for promoting metadata consistency without the complexities, burdens, and delays that transaction logs currently impose.

In contrast with conventional approaches, an improved technique for managing metadata in a data storage system includes receiving a set of data to be stored in a file system of the data storage system and calculating values of metadata blocks that the file system will use to organize the set of data in the file system. The technique aggregates values of the metadata blocks and sends them in a single, atomic transaction to a persistent cache. The transaction either succeeds, in which case the persistent cache stores the values of all of the metadata blocks, or it fails, in which case the persistent cache stores none of the values of the metadata blocks. Over time, the persistent cache flushes the values of the metadata blocks, or in some cases flushes modified versions thereof, to a set of non-volatile storage devices that back the metadata blocks in the data storage system.

Advantageously, the improved technique avoids the need for transaction logs and the performance impacts that transaction logs entail. If a failure occurs after the persistent cache has stored the values of the metadata blocks but before it flushes them to the set of non-volatile storage devices, the persistent cache can still flush later, after the system is restarted. No metadata changes are lost, and no special replay activities are required. Avoidance of replay promotes faster restarting of file systems after failures or other interruptions, thereby promoting an improved user experience. Also, given the atomic nature of storing all the metadata changes in the persistent cache, situations are avoided in which some metadata changes are made to support a transaction but others are not. Thus, consistency of file system metadata is maintained.

In some examples, the atomic transaction to the persistent cache carries not only the metadata, but also the set of data to be written. Both the metadata and data are thus stored together in the persistent cache in a single atomic transaction, eliminating latency that normally arises between the writing of data and the writing of metadata.

The improved technique is also flash-friendly, as the persistent cache generally holds metadata (and in some cases, data) for some period of time before it flushes, allowing further changes to be made in the metadata directly in the persistent cache. Thus, a series of transactions occurring in quick succession may effect multiple changes to the value of a common metadata block held in a cache page, but such changes are accumulated in the cache page until the next flush. When the non-volatile storage devices include flash drives, writes of metadata to those drives are inherently rate-limited by the flush rate from the persistent cache.

Certain embodiments are directed to a method of managing metadata in a data storage system. The method includes receiving an I/O (input/output) request that specifies a set of data to be written to a file system in the data storage system, the file system backed by a set of non-volatile storage devices. The method further includes computing values of multiple metadata blocks that the file system will use to organize the set of data in the file system and aggregating the computed values of the metadata blocks into a single transaction. The method still further includes atomically issuing the transaction to a persistent cache, such that values of all of the metadata blocks are written to the persistent cache or none of them are, the persistent cache thereafter flushing the values of the metadata blocks, or updated versions thereof, to the set of non-volatile storage devices backing the file system.

Other embodiments are directed to a data storage apparatus constructed and arranged to perform the method of managing metadata, such as the method described above. Still other embodiments are directed to a computer program product. The computer program product includes a set of non-transitory, computer-readable media that store instructions which, when executed on one or more processing units of a data storage apparatus, cause the data storage apparatus to perform a method of managing metadata, such as the method described above. Some embodiments involve activity that is performed at a single location, while other embodiments involve activity that is distributed over a computerized environment (e.g., over a network).

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing metadata in a data storage system includes receiving a set of data to be stored in a file system of the data storage system and calculating values of metadata blocks that the file system will use to organize the set of data. The technique aggregates values of all of the metadata blocks and sends them in a single, atomic transaction to a persistent cache. The transaction either succeeds, in which case the persistent cache stores the values of all of the metadata blocks, or it fails, in which case the persistent cache stores none of the values of the metadata blocks. Over time, the persistent cache flushes the values of the metadata blocks, or in some cases flushes modified versions thereof, to a set of non-volatile storage devices that back the metadata blocks in the data storage system.

Figure 1:
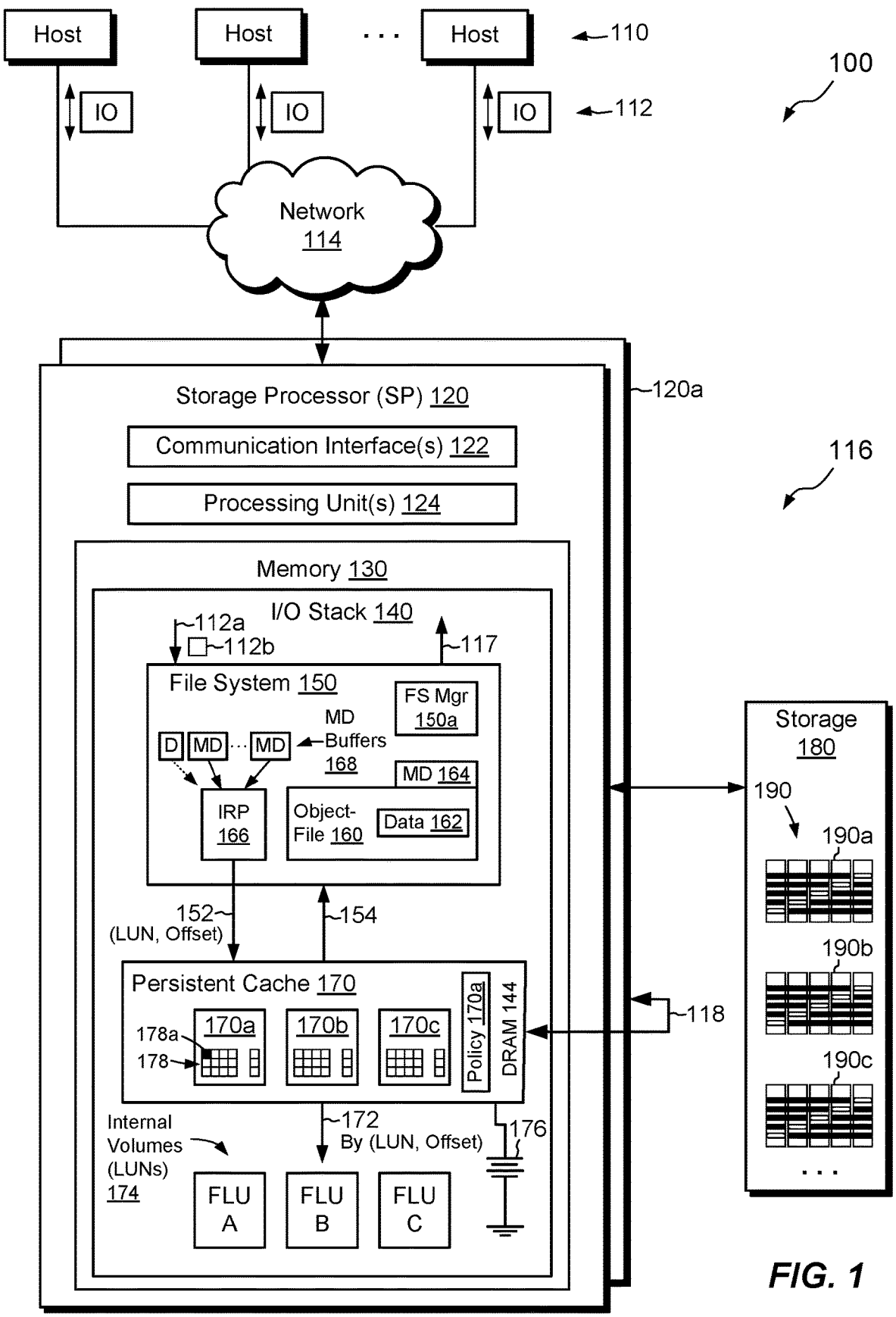
FIG. 1 is a block diagram showing an example environment in which the improved techniques hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180. In an example, the storage 180 includes multiple disk drives, such as magnetic disk drives, electronic flash drives, optical drives, and/or other types of drives.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes" (i.e., realizes by operation of programming code) an I/O stack 140. The I/O stack 140 provides an execution path for host I/O's (e.g., I/O requests 112). The I/O stack 140 includes a file system 150, a persistent cache 170, and internal volumes 174. The file system 150 has a file system manager 150a for managing its operations.

In an example, the internal volumes 174 are provided in the form of FLUs, i.e., FLU A, FLU B, and FLU C. "FLU" is an acronym for "Flare LUN," with "LUN" being an acronym for "logical unit number," a term that refers not only to an identifying number (i.e., a unit number) but also to the volume itself. Here, a FLU is a logical representation of one or more RAID groups 190. In the example shown, FLU A provides a logical representation of RAID group 190a, FLU B provides a logical representation of RAID group 190b, and FLU C provides a logical representation of RAID group 190c. The data storage system 116 may include any number of RAID groups 190, and the I/O stack 140 may provide any number of FLUs to support them.

Each FLU has an addressing scheme that the persistent cache 170 can use to access blocks of the respective RAID group. The addressing scheme for a FLU is based on a LUN (unit number) and offset into the LUN. For instance, each FLU expresses its underlying RAID group as a range of contiguous blocks, such that any block within a RAID group can be accessed by specifying an offset into that FLU. The offset represents a block number relative to a starting point of the FLU. A "block" is the smallest unit of storage that the file system 150 can allocate, which may be 4 KB, 8 KB, or some other size. Although the data storage system 116 shows the storage volumes 174 as FLUs, it should be understood that the storage volumes 174 may be any logical representation of storage in which blocks are addressed using a volume identifier and an offset.

As further shown in FIG. 1, the persistent cache 170 includes addressable sections 170a, 170b, and 170c. Each addressable section performs read and write caching for a respective FLU. Thus, for example, section 170a performs caching for FLU A, section 170b performs caching for FLU B, and section 170c performs caching for FLU C.

Cache pages 178 in the persistent cache 170 are themselves accessible using the same addressing scheme as is described above for blocks in the internal volumes (FLUs) 174, i.e., by specifying a LUN and an offset into the LUN. Thus, for example, the file system 150 can write to pages 178 in the persistent cache 170 using the same addressing scheme that the persistent cache 170 uses to write to blocks in the internal volumes 174.

In the particular example shown, the persistent cache 170 is implemented in DRAM (Dynamic Random Access Memory) 144. Although DRAM 144 is normally regarded as volatile memory, persistence of the persistent cache 170 is achieved through the use of batteries 176. The batteries 176 provide backup power in the event of a power loss and thus enable the DRAM 144 to hold its contents in place. Although other portions of the data storage system 116 may lose power and become inoperative, the persistent cache 170 continues to function.

In an example, the SP 120a is constructed similarly to the SP 120, such that the SP 120a has its own persistent cache 170, e.g., implemented in DRAM and backed by battery 176. To provide further protection, as well as other advantages, the data storage system 116 may mirror the contents of DRAM 144 on the SP 120 to the DRAM on the SP 120a, e.g., via connection 118. The converse may be the case as well, with the contents of DRAM 144 on the SP 120a mirrored over connection 118 to the DRAM on SP 120. Thus, not only is the persistent cache 170 backed by battery 176 on each SP, but also it is mirrored to the other SP, where it is also backed by battery. Of course, the data storage system 116 may include greater than two SPs, and mirroring of caches may be performed over any number of them. In an example the connection 118 over which mirroring takes place includes a PCI Express cable directly connecting the two SPs.

It should be understood that battery-backed DRAM is merely one example implementation for realizing the persistent cache 170. For example, various high-speed, persistent memory technologies are currently being developed. It is expected that the battery-backed DRAM used in the illustrated embodiments may be replaced over time with high-speed, persistent storage, which does not require battery backup to achieve its persistence. Such new storage technologies, once they become available, could easily be exchanged for DRAM as presented here, to provide even more efficient solutions. Such replacements are considered to fall within the scope of the invention hereof.

With further reference to FIG. 1, the file system 150 includes an object-file 160. In an example, the object-file 160 is a container file that provides a file-based realization of a host-accessible data object, such as a host LUN, host file system, VVol (virtual volume, available from VMware, Inc. of Palo Alto, Calif.), or some other data object. Mapping within the I/O stack 140 converts I/O requests 112, directed to the host-accessible data object, to corresponding reads and writes of the object-file 160. The file system 150 organizes both data and metadata of the object-file 160, e.g., by maintaining blocks 162 of data and blocks 164 of metadata in a physical address space of the file system 150. The physical address space may be organized by FSBN (file system block number), although other file system addressing schemes may be used. The blocks 162 of data include file data, whereas the blocks 164 of metadata include file system metadata used to organize the data 162. Such metadata may include, for example, an mode (index node), indirect blocks (IBs), i.e., arrays of block pointers, per-block metadata (BMDs), virtual block maps (VBMs), allocation bitmaps, a superblock, and/or other metadata, for example.

In example operation, one or more hosts 110 issue I/O requests 112 to the data storage system 116. The hosts 110 may direct the I/O requests 112 to a host-accessible data object in the data storage system 116, such as a LUN, file system, VVol, or some other object. The SP 120 receives the I/O requests 112 at the communication interfaces 122 and passes the I/O requests 112 to the I/O stack 140 for further processing. For a data write, the I/O stack 140 maps the I/O request 112 to a corresponding write request 112a directed to the object file 160. The write request 112a specifies a set of data 112b to be written.

The file system manager 150a allocates a buffer "D" for holding the set of data 112b in memory (e.g., main memory). The file system manager 150a then calculates values of particular file system metadata blocks (i.e., particular ones of the blocks 164) that the file system 150 will use to organize the set of data 112b. For example, the file system manager 150a allocates buffers 168 ("MD") for holding values of such metadata blocks 164 in memory. The file system manager 150a modifies the values of these metadata blocks held in the buffers 168 to accommodate the new data 112b. For example, the file system manager 150a may calculate block values that add a block pointer to an IB, update a bitmap, and in general make any changes necessary to organize the data 112b consistently. Along these lines, metadata is considered to be "consistent" when it accurately reflects a proper placement of the data 112b in the file system 150 and does not contradict itself.

Once the new metadata block values have been computed, the file system manager 150a aggregates the computed metadata block values into a single transaction, which includes all the changes needed to consistently update the file system 150 for incorporating the data 112b. The process for aggregating metadata may be similar to the one commonly used when committing metadata changes to a transaction log, i.e., the file system manager 150a groups together changes that must be effected all together as one or not at all—i.e., atomically.

The file system manager 150a then determines where to place the metadata block values in the persistent cache 170. For example, the file system manager 150a identifies the FSBN of each metadata block affected by the transaction. For each FSBN, the file system manager 150a computes or otherwise obtains a corresponding page address of a page 178 in the persistent cache 170 at which to cache the contents of the respective metadata block. As indicated above, the addressing scheme for cache pages 178 takes the form of FLU and offset, just as the addressing scheme for blocks in a FLU takes the form of FLU and offset.

Once the file system manager 150a has mapped FSBNs to corresponding FLU addresses for the metadata blocks affected by the transaction, the file system manager 150a performs a caching operation 152, which atomically issues the transaction to the persistent cache 170. For example, the file system 150 makes a call into an API (application program interface) of the persistent cache 170. The API call specifies the FLU address of each cache page to be written and directs the persistent cache 170 to cache the contents of the metadata blocks atomically. The persistent cache 170 then performs the requested caching operation, atomically writing block contents to corresponding cache pages 178 all together or not at all.

Once the caching operation 152 in the persistent cache 170 completes successfully, or fails completely (i.e., atomically), the persistent cache 170 provides an acknowledgement 154, informing the file system 150 whether the caching operation 152 succeeded or failed. Upon receiving the acknowledgement 154, the file system 150 may send an acknowledgement 117 to the requestor of the I/O request, e.g., to a host 110. In some examples, the persistent cache 170 acknowledges successful completion of the caching operation 152 only when all cache pages 178 required to be written atomically have been stored both in the persistent cache 170 on the SP 120 and in the corresponding persistent cache 170 on the SP 120a.

The file system manager 150a may repeat the above-described acts of calculating metadata block values, aggregating metadata block values that must be performed together, computing or obtaining FLU addresses for the identified blocks, and performing caching operations 152 to write pages atomically in the persistent cache 170. These acts may be repeated as new I/O requests 112 arrive and metadata changes accrue.

In an example, the caching operation 152 includes generating a single IRP (I/O request packet) 166 that specifies all the metadata block values that are aggregated for a current transaction. For example, the IRP 166 includes, for each metadata block value in the current transaction, either the contents of the metadata block value itself or a reference to a location where that metadata block value can be found. The location may be that of a buffer 168 or that of a page 178 in the persistent cache 170, e.g., if the metadata block value has been recently written to the persistent cache 170. In an example, the IRP 166 takes the form of a disparate write (DW), i.e., an IRP that specifies multiple changes that are all performed atomically. Thus, in some examples, atomicity is ensured by the IRP 166 itself. In other examples, the I/O stack 140 may enforce atomicity in other ways, which are known to those skilled in the art.

Over time, the persistent cache 170 flushes pages 178 to the internal volumes 174. For example, the persistent cache 170 performs a flushing operation 172, in which it sends the contents of cache pages to underlying FLUs using the same addresses that the file system manager 150a used to write the pages in the persistent cache 170. For example, if the file system manager 150a previously cached the contents of a metadata block to a page at address "FLU B, offset 9F3A," then the persistent cache 170, when flushing that page, directs the page to the same address, i.e., to "FLU B, offset 9F3A," in FLU B, such that the contents of the page are written to a block in FLU B. No additional address translation may be required. Writing the page to FLU B effects a write to the RAID group 190b, thus fixing the contents of the page in non-volatile memory.

Metadata changes stored in the persistent cache 170 may remain in pages 178 for an arbitrary amount of time. For example, a caching policy 170a may keep pages 178 in cache 170 for longer periods if they are frequently accessed and for shorter periods if they are rarely accessed. Also, the caching policy 170a may specify slower flushing for pages 178 that store metadata block values than it specifies for other pages. Holding metadata pages in cache for longer periods of time helps to preserve underlying flash drives that back the metadata, e.g., in the RAID groups 190, by limiting the maximum rate at which the flash drives can be written to the rate at which the persistent cache 170 flushes.

In some examples, an IRP 166 sent during a caching operation 152 may specify a metadata block value in the form of an address of a particular cache page, such as page 178a, rather than as a location of a buffer 168 or by directly including the contents in the IRP 166. Specifying the location of cache page 178a in different IRPs 166 enables the persistent cache 170 to accumulate multiple changes in a common metadata block over the course of multiple transactions, with updates to underlying storage media made only when the page 178a is flushed.

In some examples, the file system manager 150a aggregates not only metadata block values for a current transaction but also the associated data 112b. For example, the IRP 166 may include the data 112b itself, or may include a pointer to the data in memory or even in the persistent cache 170, e.g., if the data 112b was recently written. In such cases, the IRP 166 ensures that both the data and metadata for the current transaction are stored in the persistent cache 170 atomically. Combining the caching of data with metadata promotes efficiency by avoiding latency that normally accompanies separate processing of data and metadata, where the writing of data must normally be acknowledged before the writing of metadata can proceed.

The persistent cache 170 simplifies and streamlines processing of I/O requests. Rather than writing metadata transactions to a transaction log, which involves multiple writes, complex thread management, and contention, the file system manager 150a can instead write transactions directly and atomically to the persistent cache 170. The persistent cache 170 safely stores the metadata transactions, even in the event of a power failure or system panic. No replay is required upon recovery, as the persistent cache 170 preserves metadata changes as part of its normal processing.

Figure 2:
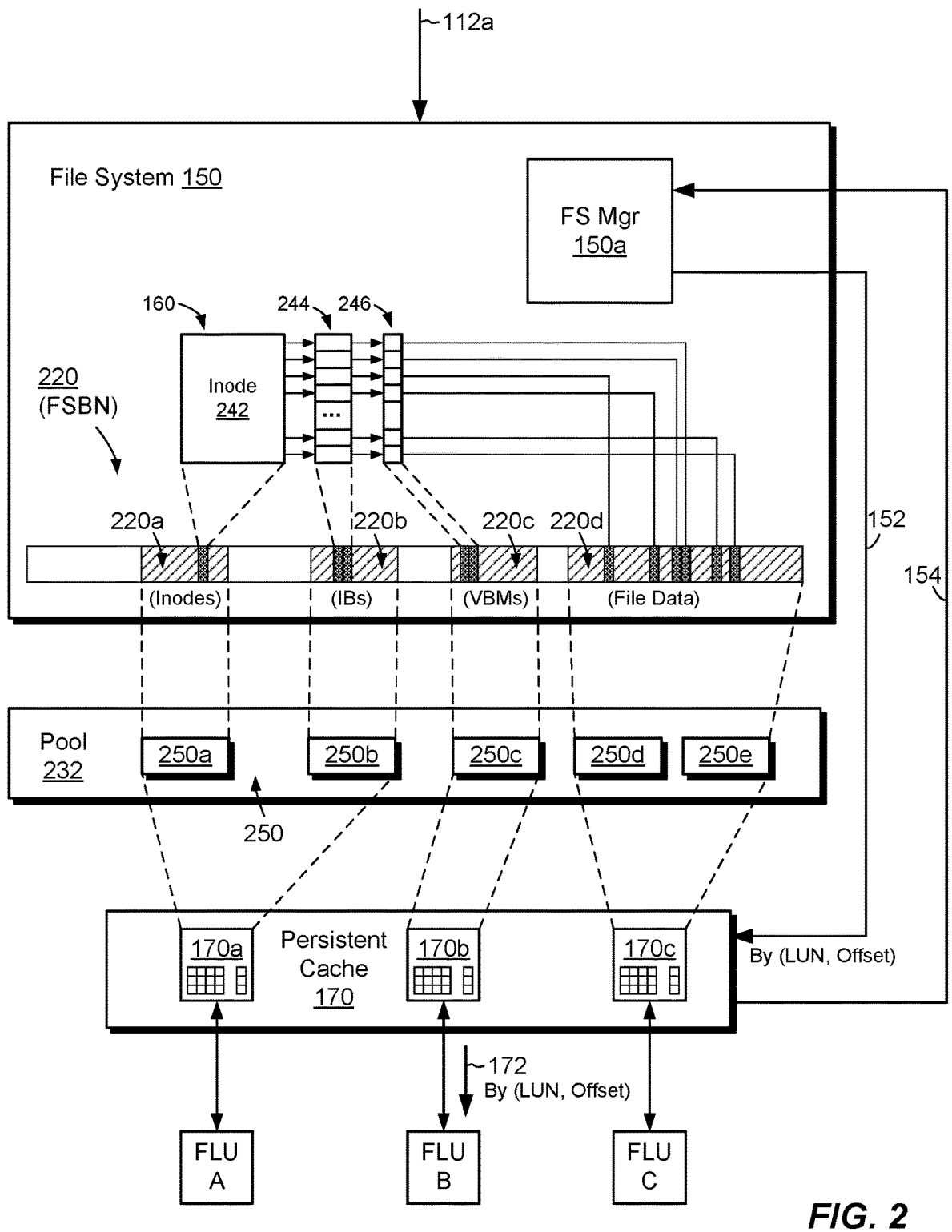
FIG. 2 is a block diagram showing example features of an I/O stack of FIG. 1 in further detail.

FIG. 2 shows an example of the I/O stack 140 in additional detail. Here, the object-file 160 is a file within file system 150. The object-file 160 has an inode 242 that stores information about the object-file 160, such as its ownership, size, and other attributes. The inode 242 points to indirect blocks (IB s) 244, which store arrays of block pointers for addressing data blocks 162 (FIG. 1). In some examples, block pointers in the IBs 244 point to VBMs (virtual block maps) 246, which in turn point to data blocks 162.

File system 150 is seen to have a physical address space 220, which may be indexed, for example, by FSBN (file system block number), where FSBN ranges from zero to some large number. In the example shown, the physical address space 220 has various subspaces, shown here with references 220a through 220d, which are supported by respective sets of slices 250 served from the storage pool 232. Subspaces 220a-220c are reserved for metadata blocks 164, whereas subspace 220d is reserved for file data blocks 162. In particular, Subspace 220a is reserved for inodes and is backed by slice 250a.
Subspace 220b is reserved for IBs and is backed by slice 250b.
Subspace 220c is reserved for VBMs and is backed by slice 250c.
Subspace 220d is reserved for file data and is backed by slices 250d and 250e.

Each subspace may be supported by any number of slices. Also, the file system 150 may include different subspaces from those shown. The example is merely illustrative.

Slices 250 are derived from FLUs, e.g., as collections of stripes across FLUs. The persistent cache 170 supports the underlying FLUs for reads and writes, and includes sections 170a, 170b, and 170c, i.e., one section for each FLU (see also FIG. 1). FLU A backs slices 250a and 250b and is supported for caching by section 170a. Similarly, FLU B backs slice 250b, which is supported for caching by section 170b, and FLU C backs slices 250d and 250e, which are supported for caching by section 170c.

Figure 3:
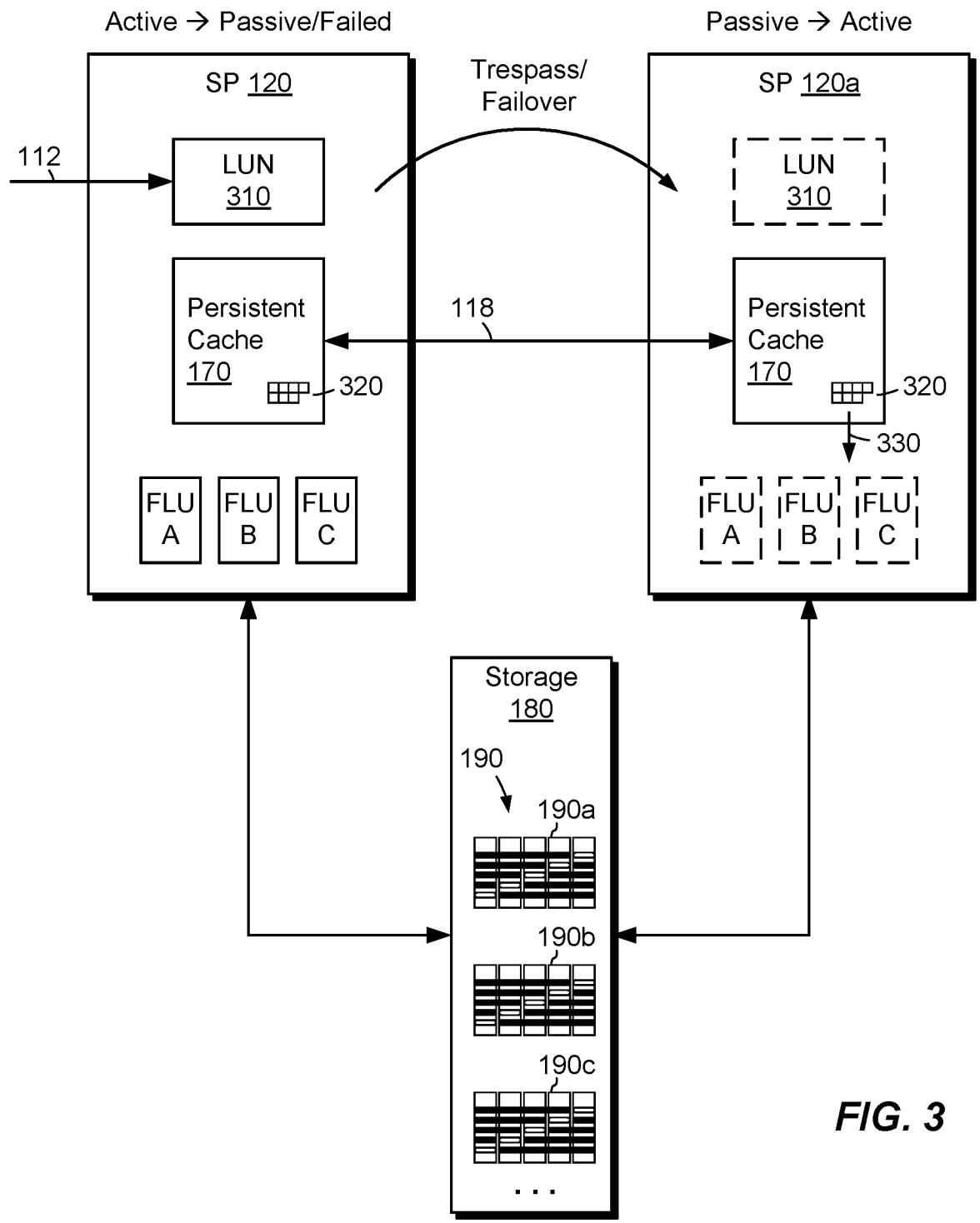
FIG. 3 is a block diagram showing an example arrangement for trespass and/or failover between storage processors.

FIG. 3 shows an example arrangement for using the persistent cache 170 to facilitate trespass and/or failover of a LUN 310 from SP 120 to SP 120a. In some examples, the LUN 310 is itself a host-accessible object. In other examples, the LUN 410 is an internal LUN, e.g., a LUN that built upon the object-file 160 for supporting a host-accessible file system.

In an initial state, SP 120 provides any of hosts 110 with access to LUN 310 for reading and writing. For example, the SP 120 may receive I/O requests 112 specifying data to be written to the LUN 310. The SP 120 may respond by writing the specified data to data blocks 162 of object-file 160 and by performing caching operations 152 to atomically store related metadata changes in the persistent cache 170.

In the course of processing I/O requests 112 directed to the LUN 310 by the SP 120, an event may occur that causes the LUN 310 to trespass to the SP 120a. For example, an administrator may manually direct the data storage system 116 to trespass the LUN 310 to the SP 120a, or the LUN 310 may trespass to SP 120a automatically. As is known, "trespass" is the act of serving a LUN from an SP that is not the LUN's default owner. In this case, SP 120 may be the default owner of the LUN 310, such that there is a trespass when the SP 120a hosts the LUN 310.

An instant before the trespass occurs, the persistent cache 170 in the SP 120 may contain metadata changes 320 in pages 178 that have not yet been flushed to FLUs. However, since the persistent cache 170 in SP 120 mirrors all metadata changes to the persistent cache 170 in SP 120a, the same metadata changes 320 are already present in the persistent cache 170 of the SP 120a when the trespass occurs.

Upon the occurrence of trespass, SP 120a takes over the hosting of LUN 310 and can pick up where SP 120 left off. For example, SP 120a may instantiate objects for supporting the FLUs A, B, and/or C from the RAID groups 190, and the persistent cache 170 on SP 120a can perform flushing operation 330 to flush the metadata changes 320 to one or more of the FLUs.

Because the persistent cache 170 is mirrored across SPs, the management of trespass becomes straightforward. For example, there is no need to replay any transaction log. In addition, the flushing operation 330 need not be done with any urgency, as pages may remain in the persistent cache 170 until they are flushed in the normal course of operation, e.g., when an LRU (least recently used) policy or some other cache policy causes them to be evicted. In the meantime, the cache pages are persistently and securely stored.

Failover from SP 120 to SP 120a works much the same way as trespass. In the failover scenario, however, SP 120 experiences a failure, which renders it unable to continue serving the LUN 310 to hosts. Based on a prearranged contingency, the service of the LUN 310 fails over to SP 120a. Upon failover, SP 120a instantiates objects for supporting FLUs A, B, and/or C from the RAID group(s) 190. SP 120 may have metadata changes 320 stored in its persistent cache 170 that have not been flushed as of the time of the failure. However, SP 120a already has the same metadata changes 320 in its own persistent cache 170, and it can thus resume processing the metadata changes in the usual course, e.g., by flushing them to FLUs as a cache eviction policy requires.

Figure 4:
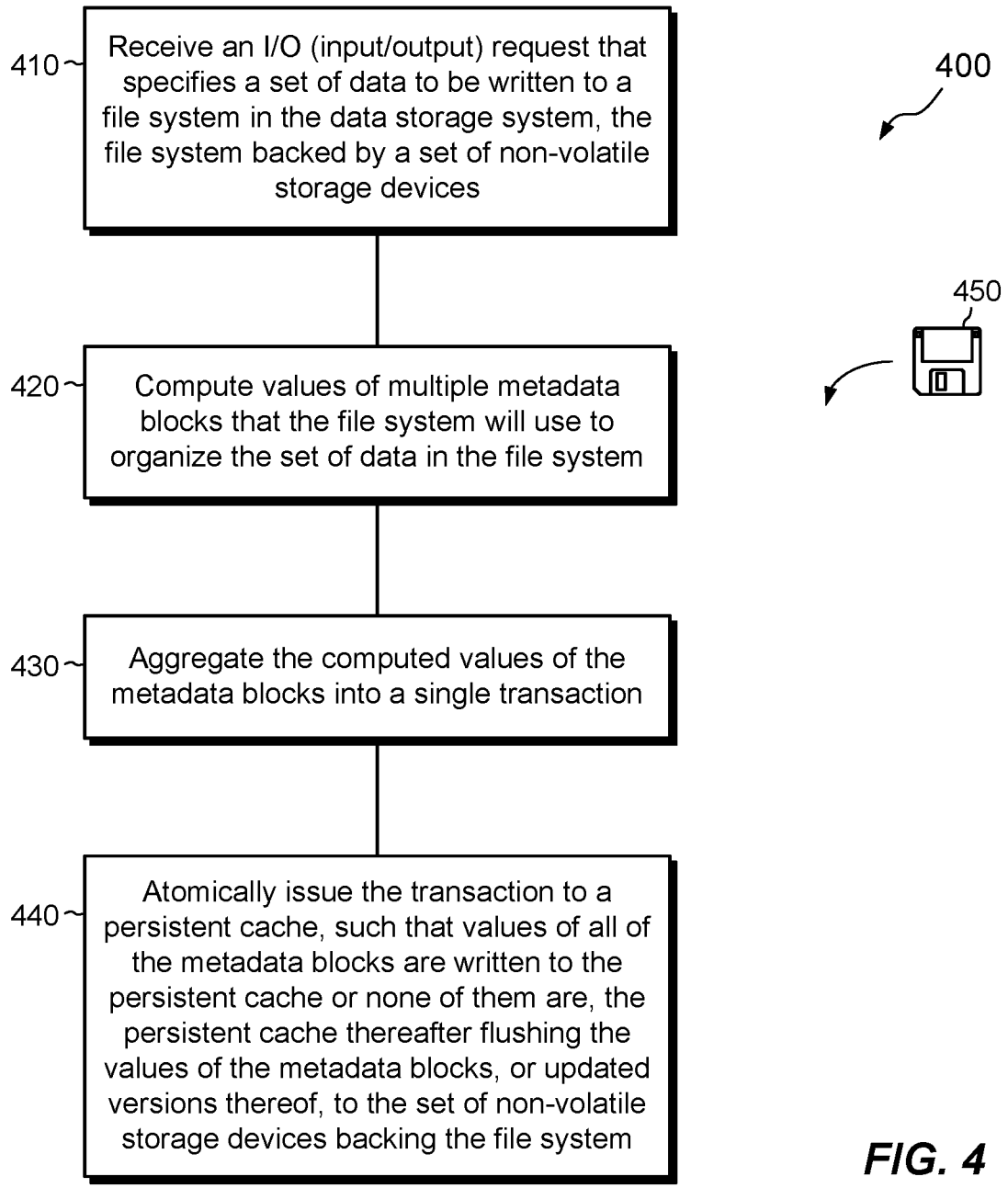
FIG. 4 is a flowchart showing an example method of managing metadata in a data storage system.

FIG. 4 shows an example process 400 for managing metadata in a data storage system and provides a summary of some of the material presented above. The process 400 may be carried out by the software constructs described in connection with FIGS. 1 and 2, which reside in the memory 130 of the storage processor 120 and are run by the set of processing units 124. The various acts of the process 400 may be ordered in any suitable way. Accordingly, embodiments may be constructed in which acts are performed in orders different from that illustrated, which may include performing some acts simultaneously.

At 410, an I/O (input/output) request is received, which specifies a set of data to be written to a file system 150 in the data storage system 116. The file system 150 is backed by a set of non-volatile storage devices (e.g., RAID groups 190). The I/O request may arrive from a host 110. Alternatively, the I/O request may be generated internally by the data storage system 116.

At 420, values are computed of multiple metadata blocks 164 that the file system 150 will use to organize the set of data in the file system 150. For example, the computed values specify the contents of metadata blocks as they will eventually be written to the file system 150.

At 430, the computed values of the metadata blocks 164 are aggregated into a single transaction, such as in a single IRP 166 implemented as a disparate write.

At 440, the transaction is atomically issued to a persistent cache 170, such that values of all of the affected metadata blocks 164 are written to the persistent cache 170 or none of them are, the persistent cache 170 thereafter flushing the values of the metadata blocks, or updated versions thereof, to the set of non-volatile storage devices backing the file system 150.

An improved technique has been described for managing metadata in a data storage system 116. The technique includes receiving a set of data 112b to be stored in a file system 150 of the data storage system 116 and calculating values of metadata blocks 164 that the file system 150 will use to organize the set of data 112b in the file system 150. The technique aggregates values of the metadata blocks 164 and sends them in a single, atomic transaction to a persistent cache 170. The transaction either succeeds, in which case the persistent cache 170 stores the values of all of the metadata blocks 164, or it fails, in which case the persistent cache 170 stores none of the values of the metadata blocks 164. Over time, the persistent cache 170 flushes the values of the metadata blocks 164, or in some cases flushes modified versions thereof, to a set of non-volatile storage devices that back the metadata blocks 164 in the data storage system 116.

Having described certain embodiments, numerous alternative embodiments or variations can be made. For example, although the object-file 160 is described as a container file, which may support storage of a LUN, host file system, or VVol, this is merely an example. Alternatively, the object-file 160 may be any type of file.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing metadata in a data storage system, the method comprising:
   receiving an I/O (input/output) request that specifies a set of data to be written to a file system in the data storage system, the file system backed by a set of non-volatile storage devices;
   computing values of multiple metadata blocks that the file system will use to organize the set of data in the file system, the multiple metadata blocks including at least one of a virtual block map (VBM), an allocation bitmap, and a superblock;
   aggregating the computed values of the metadata blocks into a single transaction; and
   atomically issuing the transaction to a persistent cache, such that values of all of the metadata blocks are written to the persistent cache or none of them are, the persistent cache thereafter flushing the values of the metadata blocks, or updated versions thereof, to the set of non-volatile storage devices backing the file system,
   wherein the persistent cache provides multiple flushing policies, and wherein the method further comprises specifying a delayed flushing policy for pages in the persistent cache that store the values of the multiple metadata blocks, the delayed flushing policy specifying flushing at a slower rate than another flushing policy provided by the persistent cache,
   wherein the method further comprises:
      receiving a second I/O request specifying a second set of data to be written to the file system;
      computing values of a second set of metadata blocks that the file system will use to organize the second set of data in the file system, the second set of metadata blocks including a common metadata block that that is also one of the multiple metadata blocks, a value of the common metadata block stored in a cache page of the persistent cache; and
      atomically issuing a second transaction to the persistent cache, such that the values of all of the second set of metadata blocks are written to the persistent cache or none of them are, the persistent cache updating the cache page that stores the value of the common metadata block to reflect a change in the value of common metadata block for incorporating the second set of data,
   wherein the data storage system further includes a set of internal volumes operatively disposed between the persistent cache and the set of non-volatile storage devices, and wherein writing the transaction to the persistent cache includes writing the values of the multiple metadata blocks to pages of the persistent cache using an addressing scheme that addresses pages by identifier of one of the set of internal volumes and offset into that internal volume.

2. The method of claim 1, wherein, when atomically issuing the transaction to the persistent cache, the method further comprises specifying the set of data as part of the transaction, such that both the set of data and all of the metadata blocks are written to the persistent cache or none of them are.

3. The method of claim 1, wherein the persistent cache provides multiple flushing policies, and wherein the method further comprises specifying a delayed flushing policy for pages in the persistent cache that store the values of the multiple metadata blocks, the delayed flushing policy specifying flushing at a slower rate than another flushing policy provided by the persistent cache.

4. The method of claim 1, wherein atomically issuing the transaction includes generating a single IRP (I/O request packet) that specifies the computed values of the multiple metadata blocks.

5. The method of claim 4, wherein the single IRP includes, for each of the multiple metadata blocks, one of (i) a computed value of the metadata block or (ii) a reference to a location where that metadata block value can be found.

6. The method of claim 5, wherein, the single IRP further includes a reference to the set of data, such that both the set of data and the values of all of the metadata blocks are atomically written to the persistent cache or none of them are.

7. The method of claim 5, wherein atomically writing the second transaction includes generating a second IRP that specifies the computed values of the second set of metadata blocks, the second IRP including a reference to the cache page in the persistent cache that stores the common metadata block.

8. The method of claim 7, further comprising:
   receiving an acknowledgment from the persistent cache that the set of data and the values of all of the multiple metadata blocks have been stored in the persistent cache; and
   upon receiving the acknowledgement from the persistent cache, sending an acknowledgement to a requestor of the I/O request that the I/O request has been completed.

9. The method of claim 1, wherein atomically issuing the transaction includes generating a single IRP (I/O request packet) that specifies the computed values of the multiple metadata blocks.

10. The method of claim 1, further comprising updating a particular metadata block of the metadata blocks in the persistent cache after atomically issuing the transaction to the persistent cache, and later flushing the updated particular metadata block to the set of non-volatile storage devices for storage therein.

11. A data storage apparatus, comprising a set of processing units and memory, the memory coupled to the set of processing units and storing executable instructions which, when executed by the set of processing units, cause the set of processing units to:
receive an I/O (input/output) request that specifies a set of data to be written to a file system in the data storage system, the file system backed by a set of non-volatile storage devices;
compute values of multiple metadata blocks that the file system will use to organize the set of data in the file system, the multiple metadata blocks including at least one of a virtual block map (VBM), an allocation bitmap, and a superblock;
aggregate the computed values of the metadata blocks into a single transaction; and
atomically issue the transaction to a persistent cache, such that values of all of the metadata blocks are written to the persistent cache or none of them are, the persistent cache thereafter flushing the values of the metadata blocks, or updated versions thereof, to the set of non-volatile storage devices backing the file system for storage of the all of the metadata blocks, or updated versions thereof, in the set of non-volatile storage devices,
wherein the persistent cache provides multiple flushing policies, and wherein the executable instructions further cause the set of processing units to specify a delayed flushing policy for pages in the persistent cache that store the values of the multiple metadata blocks, the delayed flushing policy specifying flushing at a slower rate than another flushing policy provided by the persistent cache,
wherein the executable instructions further cause the set of processing units to:
receive a second I/O request specifying a second set of data to be written to the file system;
compute values of a second set of metadata blocks that the file system will use to organize the second set of data in the file system, the second set of metadata blocks including a common metadata block that that is also one of the multiple metadata blocks, a value of the common metadata block stored in a cache page of the persistent cache; and
atomically issue a second transaction to the persistent cache, such that the values of all of the second set of metadata blocks are written to the persistent cache or none of them are, the persistent cache updating the cache page that stores the value of the common metadata block to reflect a change in the value of common metadata block for incorporating the second set of data,
wherein the data storage system further includes a set of internal volumes operatively disposed between the persistent cache and the set of non-volatile storage devices, and wherein a writing of the transaction to the persistent cache includes a writing of the values of the multiple metadata blocks to pages of the persistent cache using an addressing scheme that addresses pages by identifier of one of the set of internal volumes and offset into that internal volume.

12. A computer program product including a set of non-transitory, computer-readable media having instructions which, when executed by a set of processing units of a data storage apparatus, cause the set of processing units to perform a method of storing metadata in a data storage system, the method comprising:
receiving an I/O (input/output) request that specifies a set of data to be written to a file system in the data storage system, the file system backed by a set of non-volatile storage devices;
computing values of multiple metadata blocks that the file system will use to organize the set of data in the file system, the multiple metadata blocks including at least one of a virtual block map (VBM), an allocation bitmap, and a superblock;
aggregating the computed values of the metadata blocks into a single transaction; and
atomically issuing the transaction to a persistent cache, such that values of all of the metadata blocks are written to the persistent cache or none of them are, the persistent cache thereafter flushing the values of the metadata blocks, or updated versions thereof, to the set of non-volatile storage devices backing the file system for storage of the all of the metadata blocks, or updated versions thereof, in the set of non-volatile storage devices,
wherein the persistent cache provides multiple flushing policies, and wherein the method further comprises specifying a delayed flushing policy for pages in the persistent cache that store the values of the multiple metadata blocks, the delayed flushing policy specifying flushing at a slower rate than another flushing policy provided by the persistent cache,
wherein the method further comprises:
receiving a second I/O request specifying a second set of data to be written to the file system;
computing values of a second set of metadata blocks that the file system will use to organize the second set of data in the file system, the second set of metadata blocks including a common metadata block that that is also one of the multiple metadata blocks, a value of the common metadata block stored in a cache page of the persistent cache; and
atomically issuing a second transaction to the persistent cache, such that the values of all of the second set of metadata blocks are written to the persistent cache or none of them are, the persistent cache updating the cache page that stores the value of the common metadata block to reflect a change in the value of common metadata block for incorporating the second set of data,
wherein the data storage system further includes a set of internal volumes operatively disposed between the persistent cache and the set of non-volatile storage devices, and wherein writing the transaction to the persistent cache includes writing the values of the multiple metadata blocks to pages of the persistent cache using an addressing scheme that addresses pages by identifier of one of the set of internal volumes and offset into that internal volume.

13. The computer program product of claim 12, wherein, when atomically issuing the transaction to the persistent cache, the method further comprises specifying the set of data as part of the transaction, such that both the set of data and all of the metadata blocks are written to the persistent cache or none of them are.

14. The computer program product of claim 12, wherein the persistent cache provides multiple flushing policies, and wherein the method further comprises specifying a delayed flushing policy for pages in the persistent cache that store the values of the multiple metadata blocks, the delayed flushing policy specifying flushing at a slower rate than another flushing policy provided by the persistent cache.

15. The computer program product of claim 12, wherein atomically issuing the transaction includes generating a single IRP (I/O request packet) that specifies the computed values of the multiple metadata blocks.

16. The computer program product of claim 15, wherein the single IRP includes, for each of the multiple metadata blocks, one of (i) a computed value of the metadata block or (ii) a reference to a location where that metadata block value can be found.

17. The computer program product of claim 16, wherein, the single IRP further includes a reference to the set of data, such that both the set of data and the values of all of the metadata blocks are atomically written to the persistent cache or none of them are.

18. The computer program product of claim 16, wherein atomically writing the second transaction includes generating a second IRP that specifies the computed values of the second set of metadata blocks, the second IRP including a reference to the cache page in the persistent cache that stores the common metadata block.

19. The computer program product of claim 18, wherein the method further comprises:

receiving an acknowledgment from the persistent cache that the set of data and the values of all of the multiple metadata blocks have been stored in the persistent cache; and upon receiving the acknowledgement from the persistent cache, sending an acknowledgement to a requestor of the I/O request that the I/O request has been completed.

\* \* \* \* \*